(12) United States Patent
Eldridge

(10) Patent No.: US 6,187,398 B1
(45) Date of Patent: Feb. 13, 2001

(54) MOUSE PAD

(76) Inventor: Patrick Eldridge, 866 Main Street East, Hamilton, ON (CA), L8M 1L9

(*) Notice: Under 35 U.S.C. 154(b), the term of this patent shall be extended for 0 days.

(21) Appl. No.: 09/172,870

(22) Filed: Oct. 15, 1998

Related U.S. Application Data (60) Provisional application No. 60/062,263, filed on Oct. 17, 1997.

(51) Int. Cl.$^7$ ............................. B43L 15/00; A47G 29/00
(52) U.S. Cl. .................... 428/35.2; 428/35.7; 248/118.1; 248/346.01; 345/163; D14/458; 108/43
(58) Field of Search ................... 428/35.2, 35.7, 428/35.6, 36.5; 248/118.1, 346.01, 346.2, 346.03, 346.05; 345/163; D14/114, 458; 108/43, 42

(56) References Cited

U.S. PATENT DOCUMENTS

| | | | |
|---|---|---|---|
| D. 392,960 | * 3/1998 | Giorgio | D14/114 |
| D. 403,312 | * 12/1998 | O'Brien et al. | D14/114 |
| 5,556,061 | * 9/1996 | Dickie | 248/51 |
| 5,696,536 | * 12/1997 | Murphy | 345/163 |
| 5,730,711 | * 3/1998 | Kendall et al. | 602/64 |
| 5,738,325 | * 4/1998 | Brown | 248/346.01 |
| 5,766,387 | * 6/1998 | Wolf et al. | 156/62.4 |
| 5,779,211 | * 7/1998 | Bird | 248/346.01 |
| 5,788,203 | * 8/1998 | Nitti | 248/346.01 |
| 5,820,968 | * 10/1998 | Kurani | 428/137 |
| 5,971,340 | * 10/1999 | Murphy | 248/346.01 |
| 5,993,584 | * 11/1999 | Yates | 156/145 |
| 6,017,407 | * 1/2000 | Yates | 156/221 |

* cited by examiner

Primary Examiner—Rena L. Dye

(57) ABSTRACT

The present invention is a mouse pad for use with a computer mouse or tracking device. The mouse pad includes a planar plate including a top surface, adapted for use as a computer mousing surface. It also includes a flexible outer membrane including a bottom; wherein the planar plate is fastened to the flexible outer membrane, such that said outer membrane and planar plate define a cavity. It further includes fluid like fill media received within the cavity for supporting the planar plate such that the membrane bottom is adapted to substantially conform to the contour of an uneven surface it is placed upon, thereby providing a stable base and a usable mousing top surface when placed on uneven surfaces.

4 Claims, 8 Drawing Sheets

MOUSE PAD

This is a continuation of provisional application Ser. No. 60/062,263, filed on Oct. 17, 1997.

FIELD OF THE INVENTION

This invention relates to mouse pads and more particularly to mouse pads capable of being supported on a users thigh or other uneven surfaces.

BACKGROUND OF THE INVENTION

Keyboards and mouse input devices are the two most common devices used to input information into a computer. Today, many software programs are designed to operate exclusively with either a key board or a mouse input device hereinafter called a mouse. Many other software programs are designed to operate with both devices which allows the user to alternate between them to carry out different operations in the program.

The mouse is a common pointing device which includes a small blocked shaped casing with a flat bottom designed to be gripped by one hand. The casing has one or more buttons on the top, a multi directional detecting component on the bottom, which is usually a ball. A cable connects the mouse to the computer. When the mouse is moved over a flat surface, it generates signals which control the position of a cursor or pointer on a graphical user interface shown on the computer display.

Although a mouse can be operated on any flat surface, it is commonly used on a mouse pad. A mouse pad is a flat pad like structure made of foam or latex material having approximately the same proportions as the computer display. The top surface of the mouse pad is textured so that the multi directional detecting component is moved when the mouse is moved across the mouse pact.

The use of the mouse and other computer signalling devices traditionally has been at the side of the keyboard on the desk or the table top which supports the keyboard and computer. This placement requires that the user reach outward to the right or left of the keyboard to control and activate the mouse. As software has been more mouse instruction intensive, the user is exposed to longer periods of reaching and operating the mouse and other signalling devices from this unnatural position, exposing the user to a number of physical problems including carpal tunnel syndrome, repetitive motion injury and lower back injury and the mental problems associated with occupational related stress.

The present invention provides an operating surface for a mouse. The invention is easily and temporarily mounted on the thigh for either right hand use or left hand use of the mouse device depending upon the users preference. The present invention can also be mounted on other surfaces which may or may not be uneven.

The following inventions may be of interest:

U.S. Pat. No. 5,355,811 by Brewer dated Oct. 18, 1994, for an invention entitled ADJUSTABLE LEG SUPPORTED MOUSE PAD describes an adjustable leg supported mouse pad which requires a person using it to press a saddle like structure against the thigh, position a pillow like wedge against the top sides of the saddle, and then attach a mouse pad so that both ends of the mouse pad are supported by the pillow like support members. It is necessary that female users either wear pants, shorts, loose fitting dresses or raise their skirts to properly engage the thigh with the Brewer device.

U.S. Pat. No. 5,593,128 by Odom Et Al issued Jan. 14, 1997 for LAP SUPPORTED COMPUTER MOUSE SURFACE describes a lap supported computer surface for placing either a mouse or other objects on the surface while the user is in the seated position in front of the computer. The mouse surface is placed over both thighs of the leg and has supports on either side as well an optional additional strap to go underneath the legs of the person using it.

U.S. Pat. No. 5,355,811 to Brewer and U.S. Pat. No. 5,593,128 to Odom Et Al require straps or other rigid means in order to hold the mouse pad on the thigh of a person.

The present invention may be useful for use by persons who would like to use their mouse in areas where there is no horizontal surface to mount a conventional mouse pad. It may also be useful for handicapped or bed ridden persons, who would desire to use a computer featuring software which requires a mouse.

It is desirable to have a mouse pad which may be used in locations which are not suitable for conventional mouse pads. In particular it is desirable to have a mouse pad which can be mounted on a thigh or chair arm and provide a suitable mousing surface.

SUMMARY OF THE INVENTION

The present invention a mouse pad comprises a flexible outer membrane defining and enclosing a cavity, the outer membrane having a top and a bottom. A rigid base securely fastened to a portion of said top and defining a mouse surface, and fill media received within said cavity. The fill media being such that said bottom of said outer membrane will substantially conform to the contour of the surface it is placed upon.

Preferably the rigid base is a planar plate.

Preferably the rigid base is a planar plate securely fastened to an inner side of said top of said outer membrane.

Preferably the mouse pad further comprises a flexible inner membrane adjacent to an inner side of said outer membrane, said inner membrane defining said cavity, and said fill media placed within said cavity of said inner membrane.

Preferably the rigid base is a planar plate which is also securely fastened to said inner membrane, thereby forming said mouse surface, such that said planar plate is sandwiched between said outer membrane and said inner membrane.

Preferably said outer membrane further comprises baffles within said cavity attached to and extending between said top and said bottom of said outer membrane, whereby said baffles help maintain uniformity of said fill media within said cavity.

Preferably said rigid base is a top base securely fastened to an outer side of top of outer membrane.

Preferably the mouse pad comprises a planar plate securely fastened to an inner side of top of outer membrane, and a top base securely fastened to an outer side of top of outer membrane, such that the outer membrane is sandwiched between the planar plate and the top base.

Preferably the mouse pad comprises a flexible inner membrane adjacent to an inner side of said outer membrane, said inner membrane defining said cavity, and said fill media placed within said cavity of said inner membrane.

Preferably said inner membrane further comprises baffles within said cavity attached to and extending between an inner top and an inner bottom of said inner membrane, whereby said baffles help maintain uniformity of said fill media within said cavity.

In a presently preferred embodiment a mouse pad for use with a computer mouse or tracking device comprises:
(a) an upper surface means, including a top surface, adapted for use as a computer mousing surface; and
(b) a lower support means for supporting said upper surface means, wherein said upper surface means rests upon and is supported by said lower support means, said lower support means being connected to said upper surface means, said lower support means being deformable and able to substantially conform to the contour of an uneven surface thereby providing a stable base and a usable mousing top surface when placed on uneven surfaces.

Preferably said lower support means includes a fluid like medium.

Preferably said lower support means includes;
(a) a flexible outer membrane including a bottom;
(b) a fastening means for securely fastening said upper surface means to said flexible outer membrane, such that said outer membrane and surface means define a cavity; and
(c) fluid like fill media received within said cavity for supporting said upper surface means such that said membrane bottom is adapted to substantially conform to the contour of an uneven surface thereby providing a stable base and a usable mousing top surface when placed on uneven surfaces.

Preferably the upper surface means is a planar plate.

Preferably said uneven surface includes a persons thigh, chesterfield arm, chair arm, or similar surface.

Preferably said upper surface means comprises an upper plate securely fastened to said membrane wherein said membrane defines said cavity.

Preferably said upper surface means comprises an upper plate securely fastened to a membrane end wherein said membrane end is secured to a portion, being the attachment area, of the outer periphery of said upper plate.

Preferably said upper surface means comprises an upper plate and a cooperating lower ring securely fastened to a membrane end, such that the membrane end is sandwiched between the upper plate and lower ring wherein said membrane end is secured to a portion, being the attachment area, of the outer periphery of said upper and lower plates.

Preferably said upper surface means comprises an upper plate and a cooperating lower ring adhesively glued to a membrane end, such that the membrane end is sandwiched between the upper plate and lower ring wherein said membrane end is secured to a portion, being the attachment area, of the outer periphery of said upper plate and lower ring.

Preferably said upper surface means comprises an upper plate and a cooperating lower ring including an attachment means for securely fastening said upper plate and lower ring together with a membrane end therebetween, wherein said membrane end is secured to a portion, being the attachment area, of the outer periphery of said upper plate and lower ring.

Preferably the attachment means is selected from the group comprising: fastening screws, adhesive bonding, friction joints, dove tail joints, clip joints, male-female locking mechanisms or a combination of the above.

Preferably said fill media is selected from the group comprising: beans, beads, peas, plastic particles, sand, styrofoam chips, gel or a combination of one or more of these.

Preferably the upper surface means includes a planar plate selected from the group comprising: plastic, lexan, vinyl, wood, polycarbonate, PVC, cardboard, or a combination of one or more of these.

BRIEF DESCRIPTION OF THE DRAWINGS

The invention will now be described by way of example only, with references to the following drawings in which.

DETAILED DESCRIPTION OF THE PREFERRED EMBODIMENT

Definitions:

Mousing surface: A surface which enables the operation of a computer mouse or computer tracking device thereon.

Uneven surface: A surface not suitable for placement of a traditional thin pad or vinyl type mouse pad. Surfaces which are concave, convex, a combination of concave and convex. Non horizontal surfaces such as a persons thigh, a chesterfield or sofa arm, a chair arm, and similar surfaces.

Fluid like medium or fill media: Any material or materials which exhibit fluid like properties such that they will substantially conform to the contour of uneven surfaces. Examples include but are not limited to water, gel, beads, beans, chips, sand, plastic particles and the like.

Figure 1:
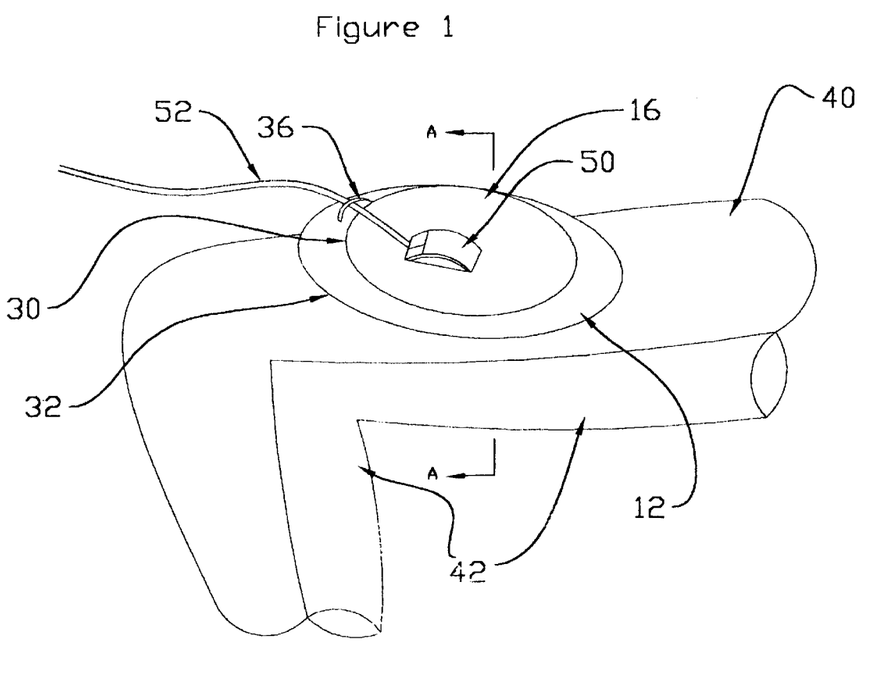
FIG. 1 is a schematic perspective view of the present invention a mouse pad shown in use mounted on a users thigh.
Figure 4:
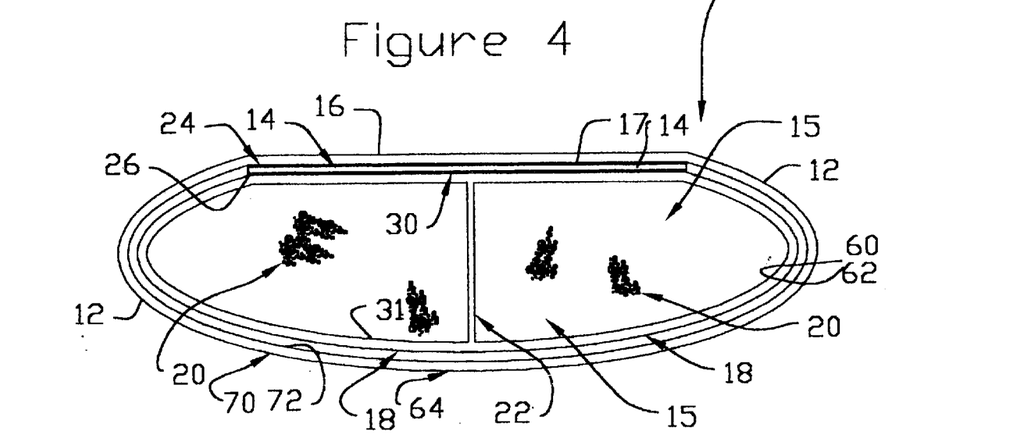
FIG. 4 is a schematic cross sectional view of mouse pad take through B—B of FIG. 3.

Referring firstly to FIGS. 1 and 4 the present invention a mouse pad shown generally as 10 comprises an outer membrane 12 defining a cavity 15 filled with fill media 20 having a mouse surface 16 and optionally having a handle 36. Mouse pad 10 is shown in position on a persons leg 42 and more particularly on the thigh top 48 of a persons thigh 40. Shown on mouse surface 16 is a computer mouse (or tracking device) 50 having a cord 52.

Figure 3:
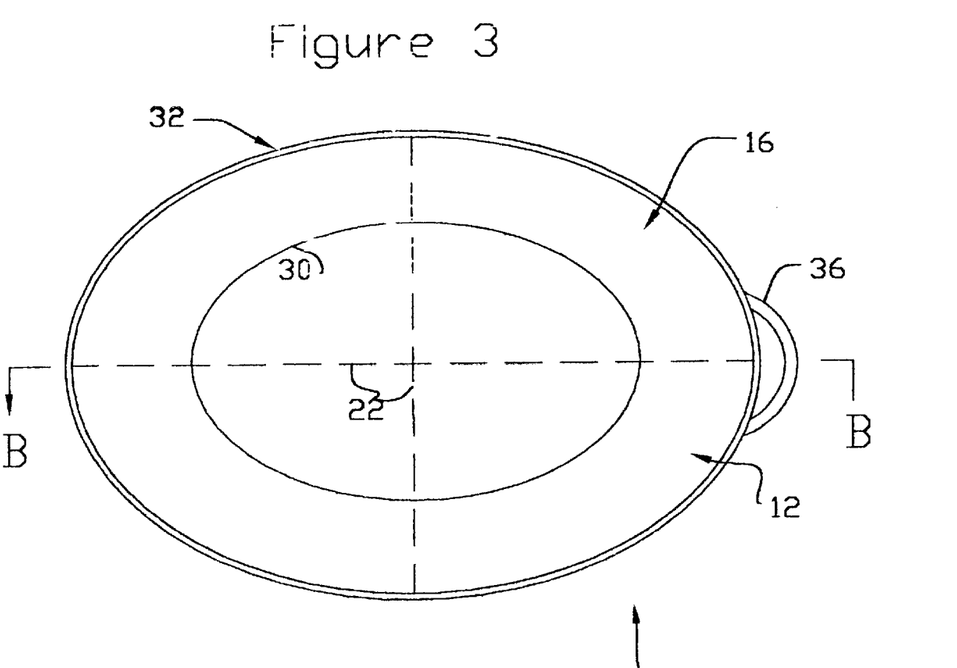
FIG. 3 is a schematic top view of the mouse pad.

Referring now to FIGS. 3 and 4, mouse pad 10 shown schematically in cross section in FIG. 4 comprises outer membrane 12 having a planar plate 14 positioned between outer membrane 12 and inner membrane 18 and is adjacent top 17 of outer membrane 12. Top surface 24 of planar plate 14 is adhesively glued to top 17 of outer membrane 12 thereby providing a flat mouse surface 16. Note that inner membrane 18 is optional and if present is filled with fill media 20. Plate bottom surface 26 is optionally adhesively glued or laminated to inner top 30 of inner membrane 18. Inner membrane 18 optionally has baffles 22 extending vertically from the inner top 30 to inner bottom 31 of inner membrane 18 to form individual compartments having fill media 20 therein. Baffles 22 serve to prevent fill media 20 from excessively accumulating in one location in inner membrane 18 thereby providing more uniformity in the distribution of fill media 20. Plate top surface 24 is preferably adhesively glued to the inner side 72 of outer membrane 12.

Figure 7:
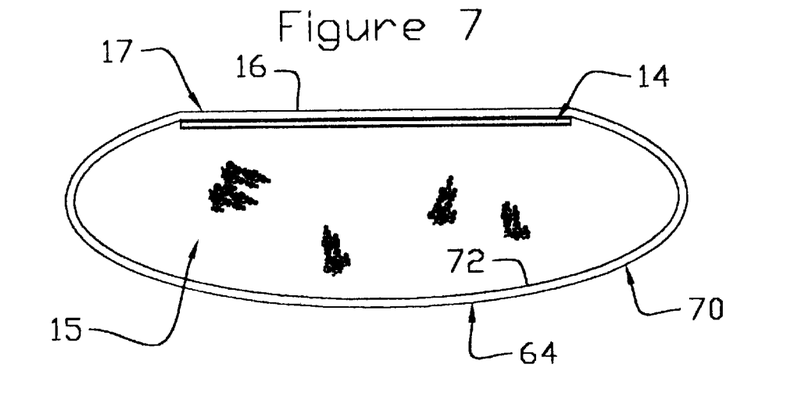
FIG. 7 is an alternate schematic cross sectional view of mouse pad take through C—C of FIG. 3.
Figure 8:
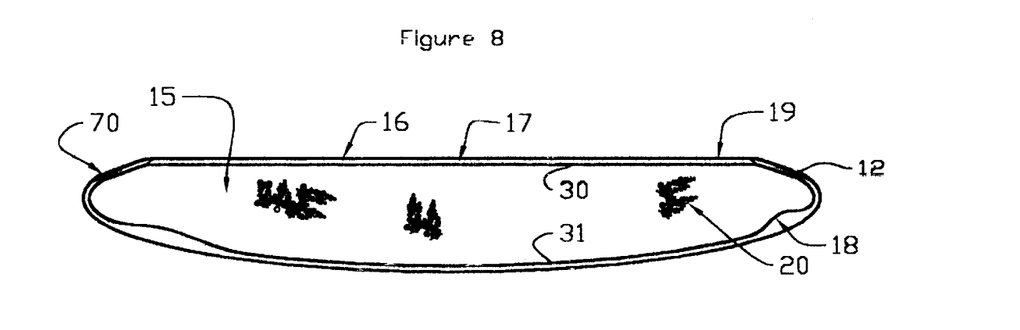
FIG. 8 is an alternate schematic cross sectional view of the mouse pad.
Figure 9:
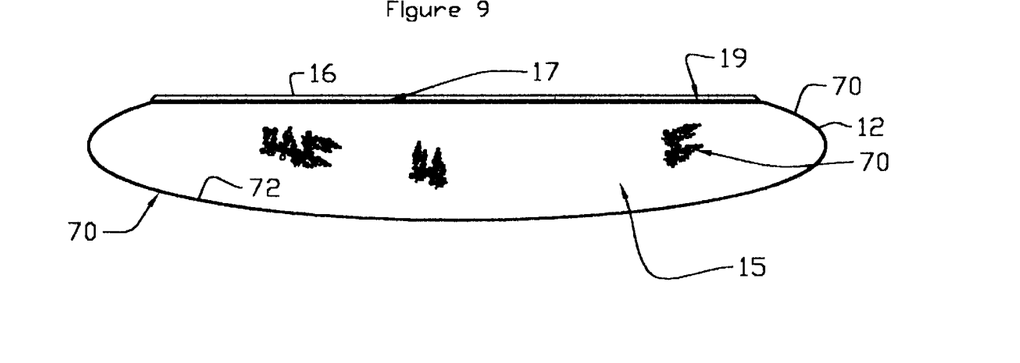
FIG. 9 is an alternate schematic cross sectional view of the mouse pad.

As shown in FIGS. 8 and 9, optionally planar plate 14 may be adhesively glued to outer side 70 of outer membrane 12. In this configuration plate bottom surface 26 is adhesively glued to outer membrane 12. Therefore mouse surface 16 may have as its outer surface outer membrane 12 as shown in FIGS. 3, 4 and 7 or top surface 24 of planar plate 14 as shown in FIGS. 8 and 9.

Fill media 20 may be beans, beads, peas, plastic particles, sand, Styrofoam chips, gel, or any other fluid like media which will allow bottom 64 of outer membrane 12 to conform to the contour of an object it is placed upon. Optionally mouse pad 10 may have a handle 36 or mouse cord retaining device or handle attached at one end.

Preferably outer membrane 12 is made from material and is sewn together in two halves which are connected at the centre at seam 60. The optional inner membrane 18 likewise is also constructed of material which is sewn together in two halves and is connected together at seam 62. Other suitable methods of construction that are known in the art are acceptable. Outer membrane 12 and inner membrane 18 may be made of cloth, plastic, netting, or any other relatively flexible material. A person skilled in the art can appreciate that prior to closing off seams 60 and 62 completely, cavity 15 is filled with an adequate amount of fill media 20.

The outer periphery 30 of planar plate 14 may be of any size or shape which is practical and useful. For example planar plate 14 when viewed from above as in FIG. 3 may be oval (as shown) or square, rectangular, round, triangular or any other shape. Outer periphery 32 of outer membrane 12 is preferably larger in diameter than outer periphery 30 of planar plate 14 to allow for droop of outer periphery 32 when placed on thigh 40. This droop allows outer membrane 12 to better follow the contour of the surface it is placed upon.

Referring now to FIGS. 5,6,7,8 and 9, alternate preferred embodiments of the present invention a mouse pad shown generally as 10 comprises an outer membrane 12, a planar plate 14, and a mouse surface 16. In these Figures you will note that inner membrane 18 has been eliminated, except as shown in FIG. 8.

Figure 2:
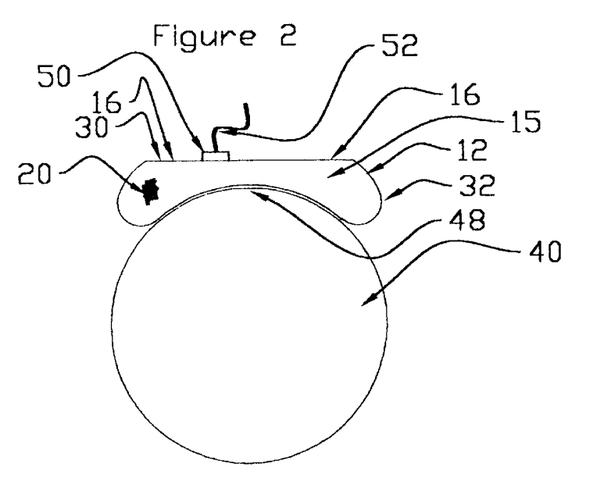
FIG. 2 is a schematic cross sectional view taken through A—A of FIG. 1.

Outer membrane 12 is filled with fill media 20 and which may be beans, beads, peas, plastic particles, sand, Styrofoam chips, gel or any other fluid like media which will allow bottom 64 of outer cover 12 to conform to the contour of an object it is placed upon. In particular bottom 64 should be able to conform to the contour of thigh top as best seen in FIG. 2. Mouse pad 10 can be manipulated to form an ergonomic wrist support or into a position most comfortable to the user.

Figure 6:
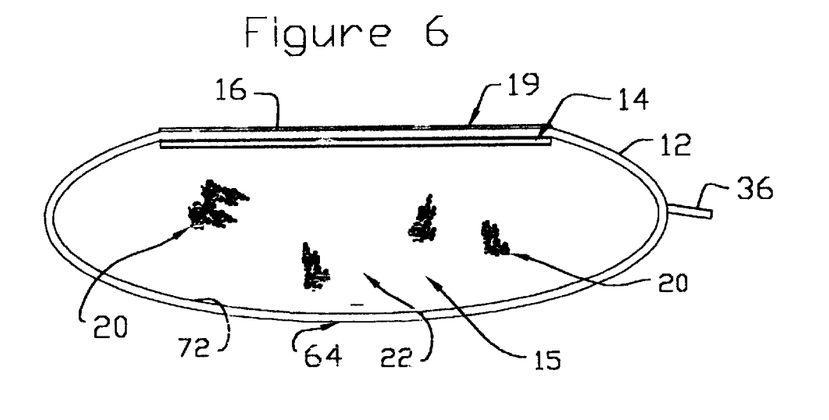
FIG. 6 is a schematic cross sectional view of mouse pad take through C—C of FIG. 3

FIG. 6 depicts an optional top base 19 which is adhesively glued to outer side 70 of top 17 of outer membrane 12.

Figure 5:
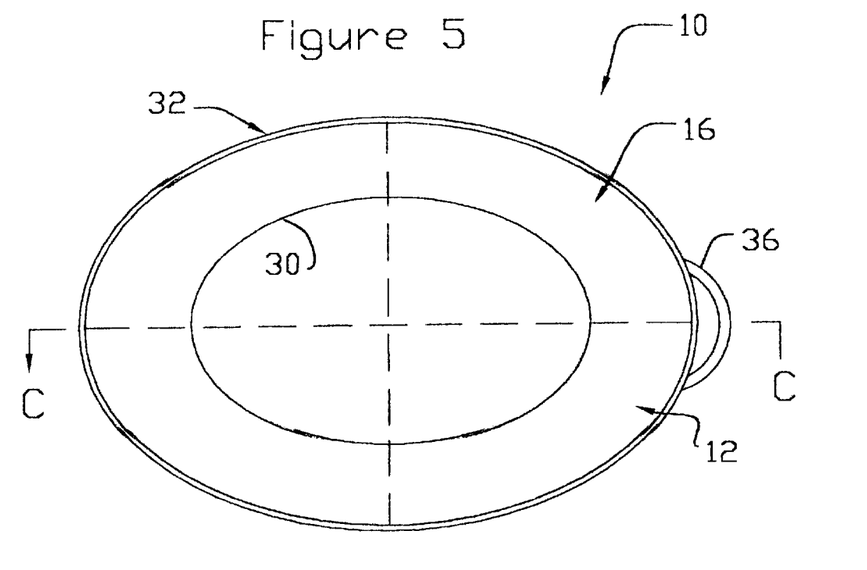
FIG. 5 is a schematic top view of mouse pad.

Viewed from the top as in FIG. 5, top base 19 has similar geometry as planar plate 14. Top base 19 when used defines mouse surface 16. The use of top base 19 permits the characteristic of mouse surface 16 to be selected independent of the material of outer membrane 12. Therefore, top base 19 may be made of material ranging from soft to hard and or special surfaces depending upon the mouse used and the users preference. Therefore top base 19 may be made of various materials for optimal mouse performance and may be attached to outer membrane 12 by adhesively glueing or laminating or spraying into position.

In FIG. 8 mouse pad 10 is depicted with top base 19 laminated onto the top 17 of outer membrane 12. In this embodiment an inner membrane 18 is also present to provide a separate cavity 15 for receiving fill media 20. In FIG. 9 mouse pad 10 is depicted with top base 19 laminated onto top 17 of outer membrane 12. This embodiment has only one membrane being outer membrane 12 which forms cavity 15 wherein fill media 20 is received.

In use, bottom 64 of mouse pad 10 is placed on a persons thigh 40. As best seen in FIG. 2, mouse pad 10 takes on the contour of thigh top 48 thereby providing a comfortable fit on a persons thigh 40. Fill media 20 is fluid in nature and will redistribute itself within the membranes when subject to outside forces such as the force of gravity acting on mouse pad 10 when placed on a surface.

As best shown in FIG. 1, mouse surface 16 is more or less a flat surface upon which mouse 50 can be manoeuvred. Mouse surface 16 may be slightly convex or concave without affecting the mouse tracking performance. Mouse cord 52 is preferably placed through an optional handle 36. There is no reason why mouse surface 16 needs to be in the horizontal position and in fact, some users may prefer to use it at some angle other than horizontal. No straps or added devices are required to hold mouse pad 10 into position but rather, mouse pad 10 is held in place through friction of bottom 64 with thigh top 48 as well as through gravitational forces. In practise it has been found that mouse surface 16 may be placed at an angle to the horizontal of for example 45.

In addition mouse pad 10 may also be placed on other surfaces such as the arm of a chesterfield or chair. The advantage of mouse pad 10 is that it does not have to be placed on a flat surface to provide an acceptable flat mousing surface.

Referring now to FIGS. 10, 11, 12, 13, 14, 15, 16 and 17 which are presently preferred embodiments of the present invention a mouse pad shown generally as 100 having a membrane 112 with bottom 113, forming a cavity 108 which is filled with fill media 110 and is assembled together with upper plate 102 and lower ring 104.

Figure 11:
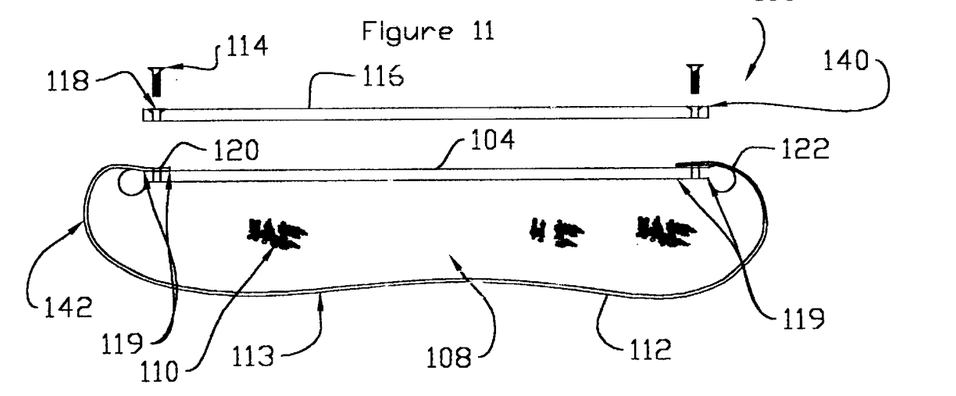
FIG. 11 is a schematic cross-section view of the presently preferred mouse pad taken through D—D of FIG. 10.
Figure 12:
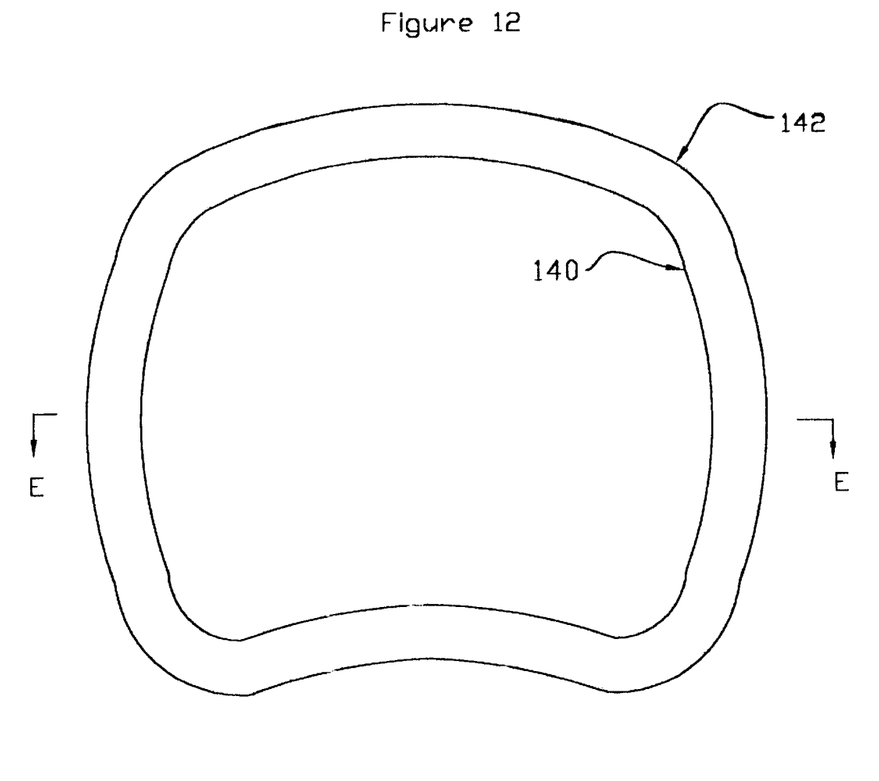
FIG. 12 is a schematic top view of a presently preferred embodiment of the mouse pad.
Figure 13:
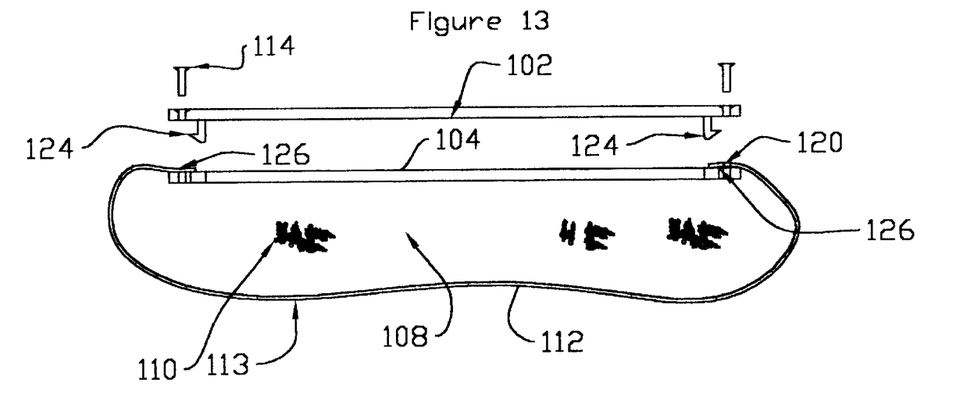
FIG. 13 is a schematic cross-sectional view of the presently preferred mouse pad taken through E—E of FIG. 12.
Figure 14:
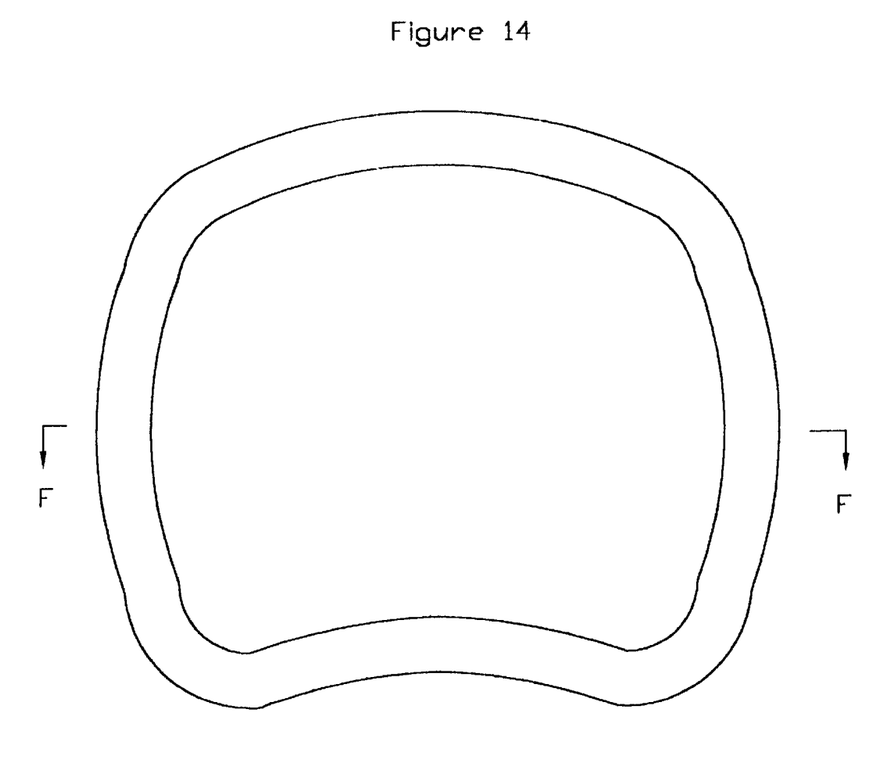
FIG. 14 is a schematic top view of the presently preferred embodiment of the mouse pad.

Referring now specifically to the cross-section of mouse pad 100 shown in FIG. 11, in this presently preferred embodiment, membrane end 120 is attached to lower ring 104 at attachment area 119 by clamping upper plate 102 together with lower ring 104 thereby sandwiching membrane end 120 between upper plate 102 and lower ring 104 at attachment area 119. The clamping forces are applied by screws 114 which are fastened through lower ring 104 and remain flush or below mouse surface 116 by using screw countersinks 118. Optionally membrane end 120 may be adhesively glued to both upper plate 102 and lower ring 104 at attachment area 119. Referring now to the cross-section show in FIG. 13 in addition to screws 114, locking clip 124 integrally molded with upper plate 102 cooperates with clip recess 126 in lower ring 104 thereby providing additional clamping force and locking between upper plate 102 and lower ring 104 when they are joined together to sandwich membrane end 120 there between.

Figure 15:
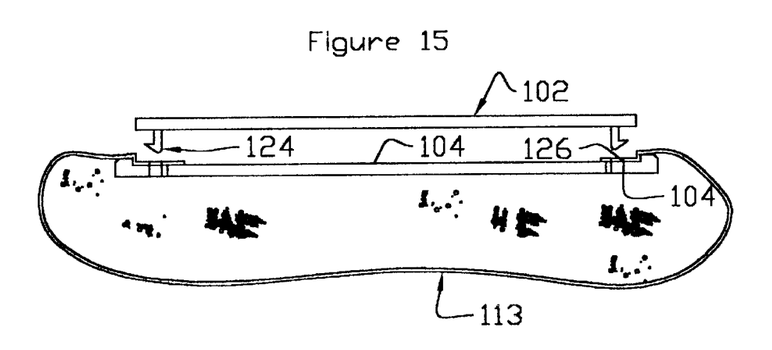
FIG. 15 is a schematic cross-sectional view of the presently preferred embodiment of the mouse pad taken through F—F of FIG. 14.
Figure 16:
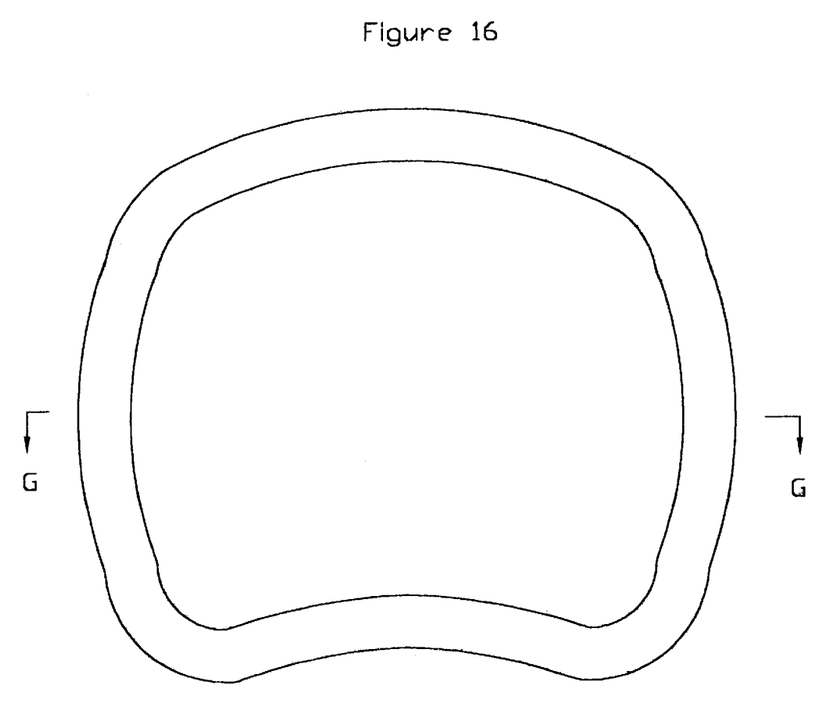
FIG. 16 is a schematic top view of the presently preferred embodiment of the mouse.

Referring now to the cross-section shown in FIG. 15, you will note that screws 114 are totally eliminated leaving only locking clips 124 cooperating with clip recess 126 to provide the necessary clamping force to lock into position membrane end 120 between upper plate 102 and lower ring 104.

Figure 17:
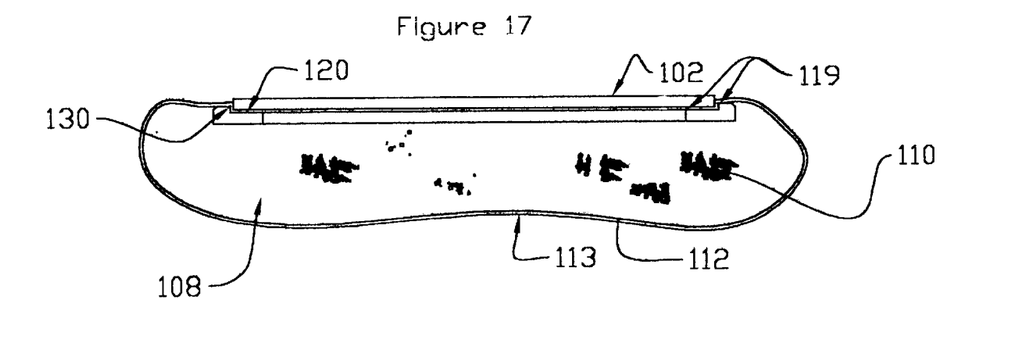
FIG. 17 is a schematic cross-sectional view of the presently preferred mouse pad taken through G—G of FIG. 16.

Referring now to FIG. 17 you will note that both screw 114 and locking clip 124 have been eliminated and membrane end 120 is adhesively glued and clamped between upper plate 102 and lower ring 104.

Figure 10:
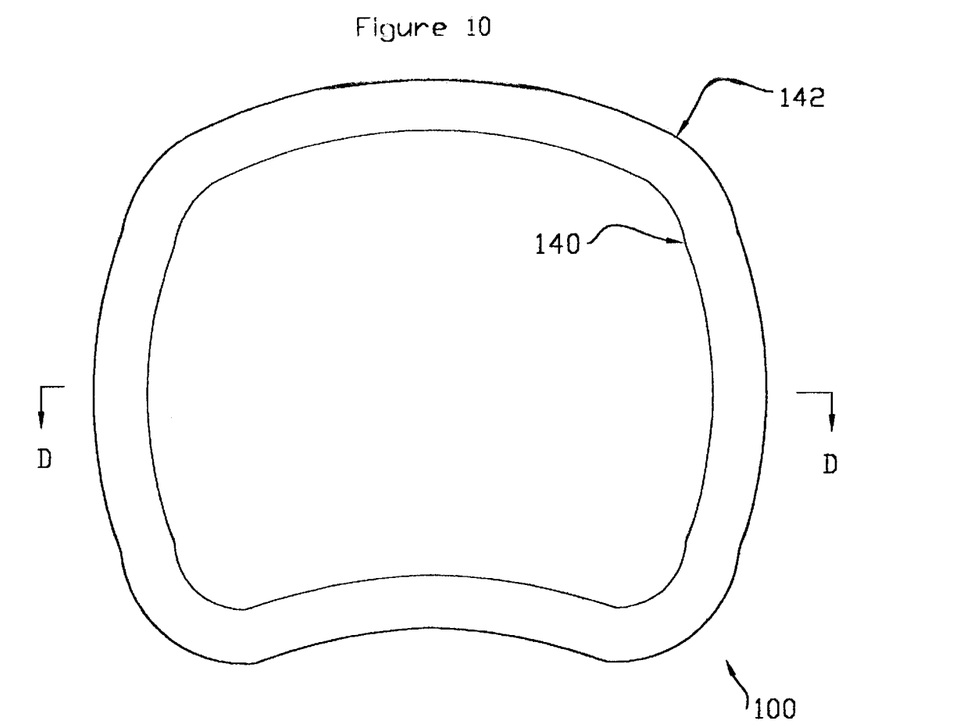
FIG. 10 is a schematic top view of a presently preferred embodiment of the mouse pad.

Outer periphery 140 of upper plate 102 is as shown in FIG. 10 and may be any other shape which is aesthetically pleasing or ergonomically practical. Outer periphery 142 is generally speaking larger in diameter and outside of outer periphery 140 and more or less parallel to the contour of outer periphery 140. Although it is not strictly necessary that out periphery 142 be parallel with outer periphery 140.

In use, mouse pad 100 is assembled by securely fastening membrane end 120 to lower ring 104 by screwing, glueing, adhesively bonding, friction joining, dove tailing, or other known methods in the art. The outer periphery of membrane 112 shown as membrane end 120 is connected at attachment area 119 to lower ring 104. Fill media 110 is then introduced into cavity 108. Subsequently upper plate 102 is also securely fastened to membrane 112 and lower ring 104 at attachment area 119. Mouse surface 116 is integrally part of upper plate 102 or can be additionally applied to upper plate 102. Bottom 113 of mouse pad 100 will substantially conform to the contour of an uneven surface. Therefore mouse pad 100 can be placed on uneven surfaces and yet provide a suitable mousing surface. The presently preferred embodiments depicted in FIGS. 10 through 17 are used in analogous fashion as the embodiments described above and depicted in FIGS. 1 through 9.

It should be apparent to persons skilled in the art that various modifications and adaptions of the structure described above are possible without departure from the spirit of the invention the scope of which is defined in the appending claims.

What is claimed is:

1. A mouse pad for use with a computer mouse or tracking device, said mouse pad comprising:
   (a) an upper surface means, including a rigid flat top surface, adapted for use as a computer mousing surface;
   (b) a lower support means for supporting said upper surface means, wherein said upper surface means rests upon and is supported by said lower support means, said lower support means being connected to said upper surface means, said lower support means being deformable and able to substantially conform to the contour of an uneven surface thereby providing a stable base and a usable mousing top surface when placed on uneven surfaces,
   wherein said lower support means includes;
   (c) a flexible outer membrane including a bottom;
   (d) a fastening means for securely fastening said upper surface means to said flexible outer membrane, such that said outer membrane and surface means define a cavity; and
   (e) fluid like fill media received within said cavity for supporting said upper surface means such that said membrane bottom is adapted to substantially conform to the contour of an uneven surface thereby providing a stable base and a usable mousing top surface when placed on uneven surfaces; and
   (f) wherein said upper surface means comprises an upper plate and a cooperating lower ring securely fastened to a membrane end, such that the membrane end is sandwiched between the upper plate and lower ring wherein said membrane end is secured to a portion, being the attachment area, of the outer periphery of said upper and lower plates.

2. A mouse pad for use with a computer mouse or tracking device, said mouse pad comprising:
   (a) an upper surface means, including a rigid flat top surface, adapted for use as a computer mousing surface;
   (b) a lower support means for supporting said upper surface means, wherein said upper surface means rests upon and is supported by said lower support means, said lower support means being connected to said upper surface means, said lower support means being deformable and able to substantially conform to the contour of an uneven surface thereby providing a stable base and a usable mousing top surface when placed on uneven surfaces,
   wherein said lower support means includes;
   (c) a flexible outer membrane including a bottom;
   (d) a fastening means for securely fastening said upper surface means to said flexible outer membrane, such that said outer membrane and surface means define a cavity; and
   (e) fluid like fill media received within said cavity for supporting said upper surface means such that said membrane bottom is adapted to substantially conform to the contour of an uneven surface thereby providing a stable base and a usable mousing top surface when placed on uneven surfaces; and
   (f) wherein said upper surface means comprises an upper plate and a cooperating lower ring adhesively glued to a membrane end, such that the membrane end is sandwiched between the upper plate and lower ring wherein said membrane end is secured to a portion, being the attachment area, of the outer periphery of said upper and lower ring.

3. A mouse pad for use with a computer mouse or tracking device, said mouse pad comprising:
   (a) an upper surface means, including a rigid flat top surface, adapted for use as a computer mousing surface;
   (b) a lower support means for supporting said upper surface means, wherein said upper surface means rests upon and is supported by said lower support means, said lower support means being connected to said upper surface means, said lower support means being deformable and able to substantially conform to the contour of an uneven surface thereby providing a stable base and a usable mousing top surface when placed on uneven surfaces,
   wherein said lower support means includes,
   (c) a flexible outer membrane including a bottom;
   (d) a fastening means for securely fastening said upper surface means to said flexible outer membrane, such that said outer membrane and surface means define a cavity; and
   (e) fluid like fill media received within said cavity for supporting said upper surface means such that said membrane bottom is adapted to substantially conform to the contour of an uneven surface thereby providing a stable base and a usable mousing top surface when placed on uneven surfaces; and
   (f) wherein said upper surface means comprises an upper plate and a cooperating lower ring including an attachment means for securely fastening said upper plate and lower ring together with a membrane end there between, wherein said membrane end is secured to a portion, being the attachment area, of the outer periphery of said upper and lower ring.

4. The mouse pad claimed in claim 3, wherein the attachment means is selected from the group comprising: fastening screws, adhesive bonding, friction joints, dove tail joints, clip joints, male-female locking mechanisms and or a combination of the above.

* * * * *